UNITED STATES PATENT OFFICE.

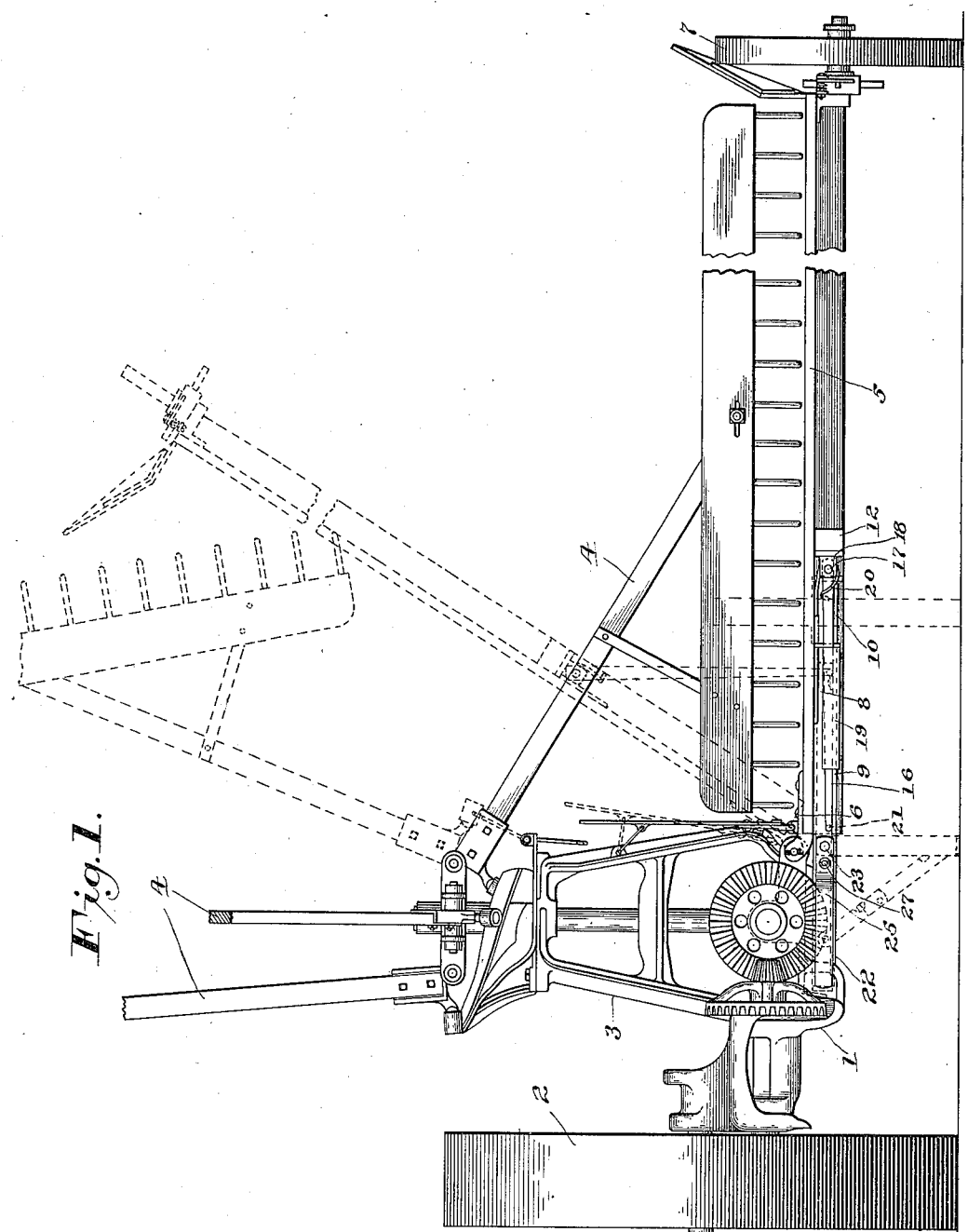

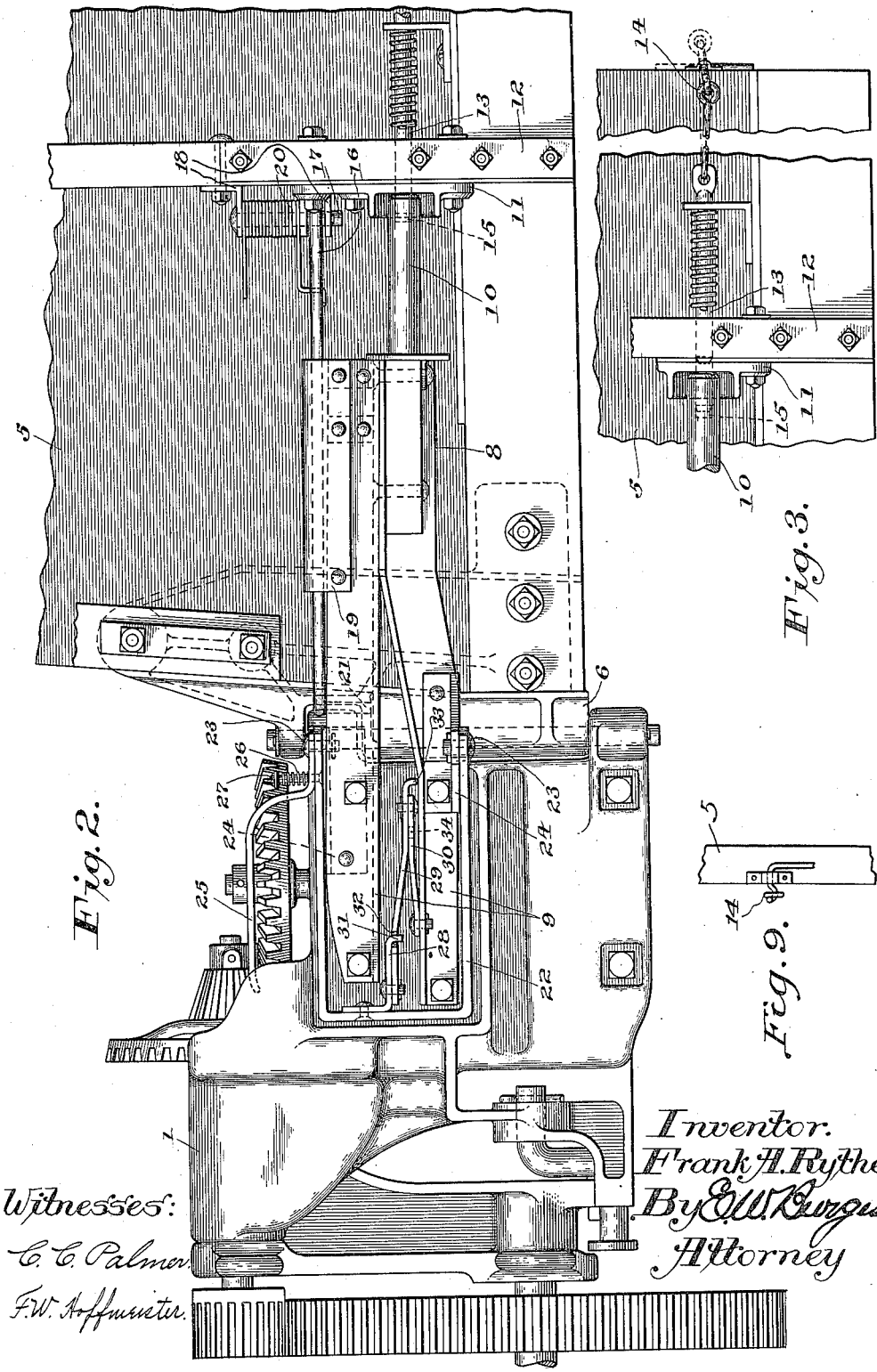

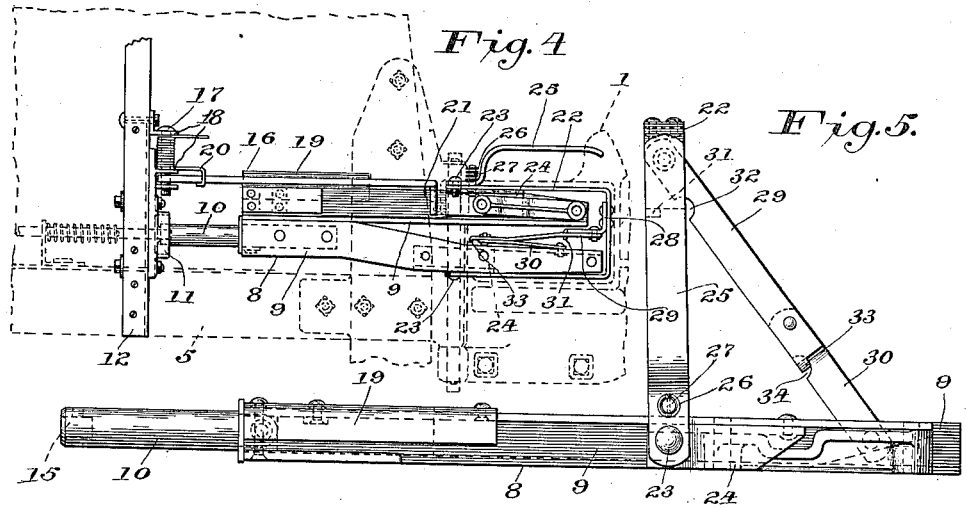
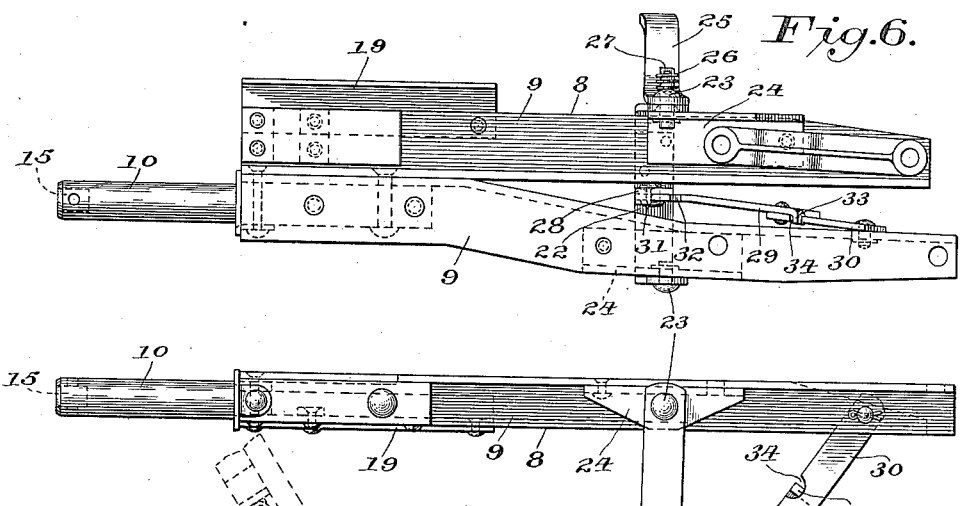
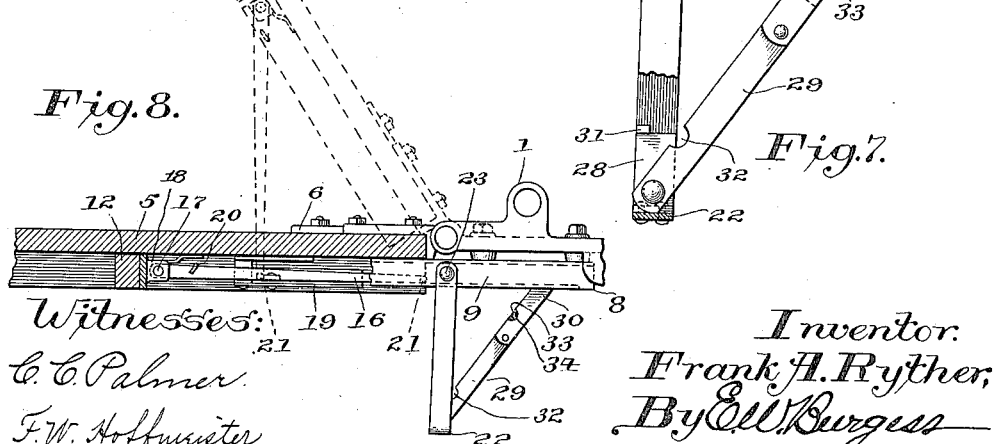

FRANK A. RYTHER, OF CHICAGO, ILLINOIS, ASSIGNOR TO INTERNATIONAL HARVESTER COMPANY, A CORPORATION OF NEW JERSEY.

REAPER.

1,090,944.   Specification of Letters Patent.   Patented Mar. 24, 1914.

Application filed July 26, 1912. Serial No. 711,631.

*To all whom it may concern:*

Be it known that I, FRANK A. RYTHER, a citizen of the United States, residing at Chicago, in the county of Cook and State of Illinois, have invented certain new and useful Improvements in Reapers, of which the following is a specification.

My invention relates to reapers, and in particular to means whereby the grain platform may be folded toward the rake mechanism for transportation; the object of my invention being to provide an improved mechanism that may be easily and quickly manipulated by the operator when it is desired to place the machine in position for transporting, and to replace the parts in operative position, the mechanism being light and simple, comprising few parts, and efficient in operation. These objects are attained by means of mechanism, one embodiment of which is illustrated in the accompanying drawings, in which—

Figure 1 is a rear elevation of a reaper having my invention embodied in the construction thereof; Fig. 2 is a bottom plan view of Fig. 1; Fig. 3 is a detail part of the structure designed to illustrate the operation of the platform locking mechanism; Fig. 4 represents a plan view of the platform supporting mechanism when arranged in an inoperative position, with the platform in operative position; Fig. 5 is a side elevation of a detail part of the frame structure designed to illustrate the operation of the folding support for the platform; Fig. 6 is a bottom view of Fig. 5; Fig. 7 is a side elevation of Fig. 6; and Fig. 8 is a sectional side elevation of part of the platform supporting mechanism designed to illustrate the operation thereof. Fig. 9 is a detail view of the latch controlling lever mechanism.

The same reference numerals designate like parts throughout the several views.

1 represents the gear frame of the machine mounted upon the traction wheel 2, having the rake stand 3 carried thereby, upon which are mounted the revolving rakes 4.

5 represents the grain platform, having the stubbleward end thereof pivotally connected with the gear frame by means of a coupling member 6, arranged in a fore and aft direction and permitting the grain platform to be turned upward toward the rake stand 3, as shown by dotted lines in Fig. 1, the grainward end of the platform being supported when in operation by means of the grain wheel 7.

8 represents a supplemental frame including angle bars 9, having the stubbleward ends thereof secured to the bottom of the gear frame 1, and their opposite ends overlapping the bottom of the grain platform when said platform is in an operative position. The grainward ends of the bars 9 are secured together, and 10 represents an axle member secured thereto, the grainward end of said axle member being received by a box-like bracket member 11 secured to the frame member 12 of the grain platform when said platform is in an operative position.

13 represents a spring-pressed plunger bolt slidably mounted upon the grain platform and controlled by means of a lever mechanism 14 carried by the grainward end thereof, the stubbleward end of the said plunger bolt being received by a socket 15 formed in the grainward end of the axle member 10 in a manner to lock the grain platform and gear frame of the machine in operative relation.

16 represents a leg member having one end thereof pivotally connected with the frame member 12 of the grain platform and by means of a pin 17 to bracket members 18, the body thereof resting upon a plate member 19 secured to one of the bars 9 and toward which it is pressed by means of a spring 20 coiled around the pin 17, and having one end thereof engaging with the platform and the opposite end with said leg, the opposite end of said leg being provided with a foot member 21 that is adapted to rest upon the plate member 19 when the grain platform is turned upward toward the rake stand, as shown by dotted lines in Fig. 1.

22 represents a U-shaped swinging support pivotally connected with the bottom of the gear frame by means of pivot pins 23 and bracket members 24, and 25 represents a curved hand piece having an opening at one end thereof that loosely receives one of the pivot pins 23.

26 represents a spring coiled about a pin 27 that is received by openings in the hand piece and the adjacent side of the U-shaped support and operative to yieldingly press the hand piece in a direction to swing the opposite end thereof into engagement with a fixed part of the gear frame in a manner to hold the swinging support in a folded position and to permit the hand piece to be disengaged therefrom when it is desired to turn the support about the axis thereof. It is to be noted that the lever 14, when swung past its dead center, acts to draw out the plunger or latch 13, and that the lever mechanism is held in this position until released by the operator 28 represents a bracket member secured to the base of the U-shaped member and pivotally connected therewith is one end of a toggle member 29, having the opposite end thereof pivotally connected with one end of a supplemental toggle member 30, the opposite end of said supplemental member being pivotally connected with one of the frame bars 9. The bracket member 28 is provided with a laterally turned lip member 31 that is received by a notch 32 in the edge of the toggle member 29 when the support is folded against the bottom of the gear frame, and operates to limit a swinging movement thereof in that direction. 33 represents a corresponding lip member formed upon the end of the toggle member 29 and adapted to be received by a notch 34 in the edge of the supplemental toggle member 30 when the swinging support is turned to a vertical position below the gear frame, the axis of the pivotal connection between the two toggle members being at a point relative to the axes of the opposite ends of said members so as to automatically lock the toggle mechanism in an extended position, as shown in Fig. 7.

In operation, when it is desired to fold the grain platform, the gear frame and platform are first raised bodily upon the traction and grain wheel until the swinging support 22 may be swung to a vertical position, as shown by dotted lines in Fig. 1. The grain wheel is then removed, the plunger bolt 13 withdrawn from the socket 15 and the platform turned upward and stubbleward, the legs 16 swinging to position to support the same. The grain wheel is then placed upon the axle member 10 and the swinging support turned upward against the bottom of the gear frame.

What I claim as being my invention, and desire to secure by Letters Patent, is:

1. A reaper including, in combination, a gear frame, a grain platform pivotally connected with said gear frame in a manner to swing upward and stubbleward, a swinging support pivotally connected with said gear frame, and a self-locking toggle connection between said gear frame and said support operative to secure said support in a vertical position relative to said gear frame.

2. A reaper including, in combination, a gear frame, a grain platform pivotally connected with said gear frame in a manner to swing upward and stubbleward, a swinging support pivotally connected with said gear frame in a manner permitting it to swing to a vertical position, and a spring-pressed hand piece carried by said support and adapted to engage with a fixed part of said gear frame in a manner to secure said support in a folded position against the bottom of said gear frame.

3. A reaper including, in combination, a gear frame, a grain platform pivotally connected with said gear frame in a manner to swing upward and stubbleward, a supplemental frame secured to said gear frame and extending grainward therefrom, a swinging leg carried by said grain platform and adapted to engage automatically with said supplemental frame in a manner to retain said grain platform in a raised position, and means on said supplemental frame guiding and limiting the movement of said leg.

4. A reaper including, in combination, a gear frame, a grain platform pivotally connected with said gear frame in a manner to swing upward and stubbleward, a supplemental frame secured to said gear frame and extending grainward therefrom, a swinging leg pivotally connected with said grain platform, and a spring operative between said platform and leg in a manner to swing said leg into engagement with said supplemental frame when said platform is in a raised position.

5. In a reaper, a reaper frame, a grain platform pivotally mounted thereon, a stub axle carried by said reaper frame and underlying said grain platform, and latching mechanism carried on said platform locking the latter to said stub axle.

6. In a reaper, a reaper frame, a grain platform pivotally connected thereto, a stub axle fixed to said reaper frame and protruding beneath said grain platform, and a spring pressed plunger carried by said grain platform and receivable in the end of said axle to lock the platform to said axle.

7. In a reaper, a reaper frame, a grain platform pivotally connected thereto, a stub axle fixed to said reaper frame and protruding beneath said grain platform, a latch carried on said grain platform normally locking the latter to said axle, and lever mechanism operatively connected to said latch mechanism operable to release said platform and retain the latch in its released position.

8. In a reaper, a reaper frame, an adjustable grain platform pivotally mounted thereon, a swinging support pivotally connected to said reaper frame, said support being normally disposed in the plane of said platform and movable about its pivot to its operative position, and means locking said support in its operative and inoperative positions.

9. In a reaper, a reaper frame, an adjustable grain platform pivotally mounted thereon, a swinging support pivotally connected to said reaper frame, said support being normally disposed in the plane of said platform and movable about its pivot to its operative position, a spring pressed operating member therefor coöperating with said frame to lock said support in inoperative position, and a toggle connection between said support and frame locking said support in operative position.

10. In a reaper, a reaper frame, a grain platform pivotally connected thereto, a supplemental frame carried on said reaper frame and underlying said platform, a swinging support pivotally connected to said reaper frame, and a hand lever resiliently connected to said support and movable laterally with respect thereto normally locked in position by said reaper frame and operable upon movement about the support pivot to adjust said swinging support.

FRANK A. RYTHER.

Witnesses:
EDWARD J. TEUFEL,
CHAS. H. JARMUTH.

Copies of this patent may be obtained for five cents each, by addressing the "Commissioner of Patents, Washington, D. C."